3,178,449
THIAINDANE DERIVATIVES
Paul Schmidt, Therwil, and Max Wilhelm, Basel, Switzerland, assignors to Ciba Corporation, a corporation of Delaware
No Drawing. Filed Aug. 28, 1961, Ser. No. 134,111
Claims priority, application Switzerland, Sept. 9, 1960, 10,218/60; July 6, 1961, 7,937/61
10 Claims. (Cl. 260—330.5)

The present inevntion relates to 2-oxo-3:3-di-(para-hydroxyphenyl)-1-thiaindanes substituted in the thiaindane residue, and their esters and phenolates.

The new compounds contain in the thiaindane residue preferably halogen atoms such as fluorine, chlorine or bromine atoms, or nitro groups and if desired also lower alkyl groups such as methyl, ethyl, n-propyl or isopropyl, butyl or pentyl groups, or also lower alkoxy such as methoxy, ethoxy or propoxy groups.

Esters of the new compounds are, for example, those of alkanecarboxylic acids, for example of lower alkanecarboxylic acids such as acetic acid, propionic acid, butyric acid or trimethylacetic acid. Suitable phenolates are the salts with bases, for example, those of alkali metals or alkaline earth metals such as sodium, potassium or calcium.

The new compounds possess valuable properties; they act, for example, against bacteria and fungi, for example against dermatophytes, Candida albicans and Gram-positive bacteria. Accordingly, they can be used more especially as disinfectants or preservatives.

Special mention deserve compounds of the formula

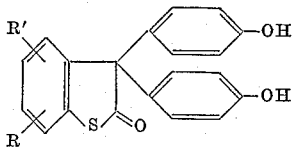

in which R represents halogen, more especially chlorine, and R' has the same meaning as R or represents a hydrogen atom or an alkyl radical with 1 to 4 carbon atoms.

The new thiaindanes are prepared by as such known methods, for example by condensing a substituted 2:3-di-oxo-1-thiaindane with phenol and, if desired, resulting hydroxy compounds or their phenolates are transformed one into the other or into the esters.

The condensation is advantageously carried out in the presence of a condensing agent, such as anhydrous sulfuric or phosphoric acid, toluenesulfonic acid, zinc chloride, aluminum chloride, tin tetrachloride or a phosphorus halide, in the presence or absence of a solvent or diluent, such as benzene or toluene. It is of advantage to use an excess of phenol so that it can serve at the same time as solvent for the thiaindane component. It is of advantage to work at room temperature or, if necessary, at a higher or lower temperature under atmospheric or superatmospheric pressure, or in the presence of an inert gas such as nitrogen.

The conversion of the hydroxyl compound to an ester thereof is carried out in the known manner, for example by reaction with a suitable acid or a functional derivative thereof suitable for the esterification, such as an ester, halide or more especially anhydride, in the presence or absence of a solvent or diluent and/or of an esterification catalyst.

Depending on the reaction conditions employed the hydroxyl compounds are obtained in the free form or in the form of their phenolates. From the phenols the phenolates can be obtained in the conventional manner, for example those of the alkali or alkaline earth metals.

The starting materials are known or can be prepared by known methods.

The new compounds may be used as disinfectants and preservatives in a wide range of spheres. Inter alia, they are suitable for disinfecting the skin, for example the hands, instruments, bandages, underwear or the like, and also for disinfecting or preserving foodstuffs or feedingstuffs. They may be used by themselves or in admixtures, in solution or as emulsion and/or together with other active or inert substances as ointments or in the form of dry powders.

The following examples illustrate the invention.

*Example 1*

A mixture of 10 grams of 2:3-dioxo-5-methyl-6-chloro-1-thiaindane and 50 grams of phenol is treated with 10 cc. of concentrated sulfuric acid and the whole is kept for 3 hours at room temperatures. 200 cc. of water are then added and the reaction product is extracted with methylene chloride. After drying over sodium sulfate and distilling off the solvent, an oily residue remains from which the excess phenol is distilled off under a pressure of 40 mm. Hg. The remaining 2-oxo-3:3-di-(parahydroxyphenyl)-5-methyl-6-chloro-1-thiaidane of the formula

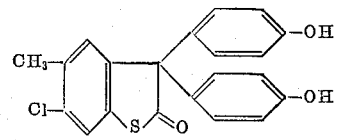

melts at 223–228° C. after having been recrystallized from aqueous ethanol.

*Example 2*

A mixture of 10 grams of 2:3-dioxo-4:6-dichloro-7-methyl-1-thiaindane and 50 grams of phenol is treated with 10 cc. of concentrated sulfuric acid. After standing for 3 hours at room temperature the reaction product is mixed with 200 cc. of water and extracted with methylene chloride. The methylene chloride extract is dried over sodium sulfate and the solvent is then distilled off. A semi-crystalline product is obtained from which the excess phenol is removed by distillation under a pressure of 40 mm. Hg. The distillation residue contains the 2-oxo-3:3-di-(para-hydroxyphenyl)-4:6-dichloro-7-methyl-1-thiaindane of the formula

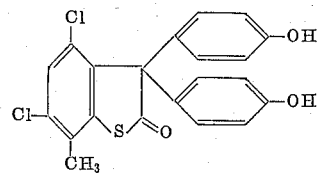

which melts at 230° C. after recrystallization from aqueous ethanol.

*Example 3*

An intimate mixture of 10 grams of 2:3-dioxo-4-methyl-6-chloro-1-thiaindane and 50 grams of phenol is slowly treated with 6 cc. of concentrated sulfuric acid and the mixture is kept for 3 hours at room temperature. 100 cc. of ice water are then added and the reaction product is extracted with methylene chloride. The methylene chloride extract is dried over sodium sulfate and then freed from the solvent on a water bath and then under a vacuum of 30–40 mm. Hg from excess phenol.

The resulting solid residue is recrystallized from ether+chloroform, to yield 2-oxo-3:3-di-(para-hydroxyphenyl)-4-methyl-6-chloro-1-thiaindane of the formula

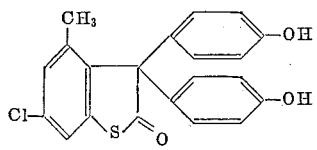

in crystals melting at 245° C.

*Example 4*

A mixture of 20 grams of 2:3-dioxo-6-methoxy-1-thiaindane and 100 grams of phenol is treated with 12 cc. of concentrated sulfuric acid and kept for 3 hours at room temperature. 200 cc. of water are then added and the reaction mixture is extracted from methylene chloride. After having dried the extract and distilled off the solvent, a semi-crystalline residue remains from which the excess phenol is removed by distillation under a pressure of 30 mm. Hg. The remaining 2-oxo-3:3-di-(para-hydroxyphenyl)-6-methoxy-1-thiaindane of the formula

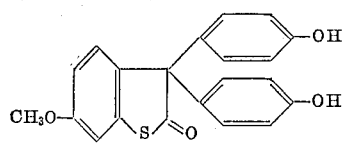

can be crystallized from aqueous ethanol, whereupon it melts at 233–234° C.

*Example 5*

A mixture of 7 grams of 2-oxo-3:3-di-(para-hydroxyphenyl)-6-methoxy-1-thiaindane and 50 cc. of acetic anhydride is heated for 4 hours at 120° C. On cooling, 2 - oxo - 3:3 - di - (para - acetoxyphenyl) - 6 - methoxy-1-thiaindane of the formula

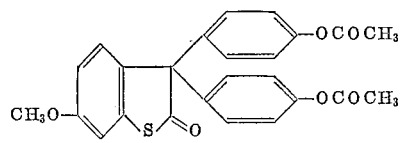

separates out in crystalline form. After having been recrystallized from glacial acetic acid it melts at 199–200° C.

*Example 6*

A mixture of 8 grams of 2-oxo-3:3-di-(para-hydroxyphenyl)-4-methyl-6-chloro-1-thiaindane and 50 cc. of acetic anhydride is heated for 6 hours at 120° C. The reaction mixture is then evaporated to dryness. Crystallization of the solid residue from ethanol yields 2-oxo-3:3 - di - (para - acetoxyphenyl) - 4 - methyl - 6 - chloro-1-thiaindane of the formula

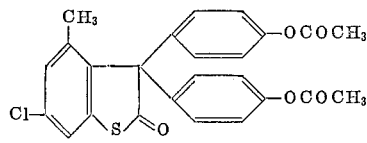

in crystals melting at 157–158° C.

*Example 7*

A mixture of 10 grams of 2:3-dioxo-5-methyl-6-chloro-thiaindane, 50 grams of phenol and 50 grams of polyphosphoric acid is heated for 4 hours at 50° C. 200 cc. of water are then added and the reaction product extracted with chloroform. After separating the chloroform layer, the solvent is distilled off; an oil remains from which the excess phenol is removed by distillation under a water-jet vacuum. The remaining 2-oxo-3:3 - di - (p - hydroxyphenyl) - 5 - methyl - 6 - chloro-1-thiaindane is recrystallized from ethanol+water and melts at 224–228° C.; it is identical with the product described in Example 1.

*Example 8*

A cream containing 1% of 2-oxo-3:3-di-(p-hydroxyphenyl)-4-methyl-6-chloro-1-thiaindane may be prepared with the following ingredients:

| | Percent |
|---|---|
| 2 - oxo - 3:3 - di - (p - hydroxyphenyl) - 4 - methyl-6-chloro-1-thiaindane | 1 |
| Water | 6 |
| Propyleneglycol | 30 |
| Polyethyleneglycols | 63 |

For the preparation of the cream, 2-oxo-3:3-di-(p-hydroxyphenyl)-4-methyl-6-chloro-1-thiaindane is dissolved in propyleneglycol by gentle heating. The solution and the water are stirred into the melted polyethyleneglycols and cooled to room temperature.

*Example 9*

A tincture containing 1% of 2-oxo-3:3-di-(p-hydroxyphenyl)-4-methyl-6-chloro-1-thiaindane may be prepared with the following ingredients:

| | | |
|---|---|---|
| 2-oxo-3:3-di-(p-hydroxyphenyl)-4-methyl - 6 - chloro-1-thiaindane | percent | 1 |
| Acetone | do | 8 |
| Isopropyl alcohol | do | 52 |
| Water, q.s. | percent by vol | 100 |

For the preparation of the tincture, 2-oxo-3:3-di-(p-hydroxyphenyl) - 4 - methyl-6-chloro-1-thiaindane is dissolved in acetone; isopropyl alcohol and then water are added.

What is claimed is:

1. A member selected from the group consisting of a compound of the formula

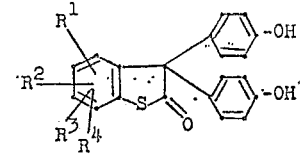

wherein $R^1$, $R^2$ and $R^3$ each stands for a member selected from the group consisting of hydrogen, halogen, nitro, lower alkyl and lower alkoxy and $R^4$ stands for a member selected from the group consisting of halogen, nitro, and lower alkoxy, an unsubstituted lower alkanecarboxylic acid ester and an alkali metal and alkaline earth metal phenolate thereof.

2. A compound of the formula

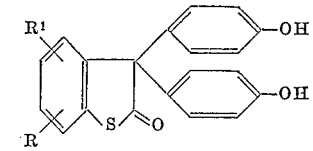

wherein R and $R^1$ each stands for halogen.

3. A compound of the formula

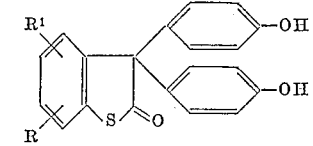

wherein R stands for halogen and $R^1$ for lower alkyl containing 1 to 4 carbon atoms.

4. A compound of the formula

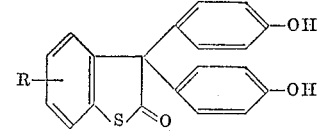

wherein R stands for halogen.

5. 2-Oxo-3:3-di-(para-hydroxyphenyl) - 5 - methyl-6-chloro-1-thiaindane.

6. 2-Oxo-3:3-di-(para-hydroxyphenyl) - 4:6 - dichloro-7-methyl-1-thiaindane.

7. 2-Oxo-3:3-di-(para-hydroxyphenyl) - 4 - methyl-6-chloro-1-thiaindane.

8. 2-Oxo-3:3-di-(para-hydroxyphenyl) - 6 - methoxy-1-thiaindane.

9. 2-Oxo-3:3-di-(para-acetoxyphenyl) - 6 - methoxy-1-thiaindane.

10. 2-Oxo-3:3-di-(para-acetoxyphenyl) - 4 - methyl-6-chloro-1-thiaindane.

References Cited by the Examiner

UNITED STATES PATENTS

| | | | |
|---|---|---|---|
| 2,861,919 | 11/58 | Gilbert | 167—65 |
| 2,958,624 | 11/60 | Bimber | 167—65 |
| 2,992,232 | 7/61 | Bloom | 260—330.5 |
| 3,010,972 | 11/61 | Kaiser et al. | 260—330.5 |

OTHER REFERENCES

Candea: Bull. sci. ecole polytech. Timisoara, vol. 8, pp. 191–228 (1939).

Hartough et al.: Condensed Thiophenes, Interscience Publishers, Inc. (1954), page 100.

Danaila et al.: Chemical Abstracts, vol. 10, page 2095 (1916), abstracting Bull. sect. sci. acad. raumaine, vol. 4, p. 334 (1916).

IRVING MARCUS, *Primary Examiner.*

JOHN D. RANDOLPH, WALTER A. MODANCE,
*Examiners.*